United States Patent
Nemeth et al.

(10) Patent No.: US 9,912,606 B2
(45) Date of Patent: *Mar. 6, 2018

(54) APPARATUS AND METHOD TO SECURE ACQUISITION AND CONTENTION BURST ACTIVITY IN A COMMUNICATION NETWORK

(71) Applicant: VT IDIRECT, INC., Herndon, VA (US)

(72) Inventors: David Thompson Nemeth, Washington, DC (US); Jason B Maiorana, Vienna, VA (US); Sadaf Fardeen, Centreville, VA (US)

(73) Assignee: VT IDIRECT, INC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,074

(22) Filed: Dec. 23, 2016

(65) Prior Publication Data

US 2017/0111290 A1    Apr. 20, 2017

Related U.S. Application Data

(63) Continuation of application No. 13/806,937, filed as application No. PCT/US2010/040034 on Jun. 25, 2010, now Pat. No. 9,559,979.

(51) Int. Cl.
*H04B 7/212* (2006.01)
*H04L 12/911* (2013.01)
*H04L 12/403* (2006.01)

(52) U.S. Cl.
CPC ........ *H04L 47/781* (2013.01); *H04L 12/4035* (2013.01)

(58) Field of Classification Search
CPC ............................ H04L 12/407; H04L 12/417
See application file for complete search history.

(56) References Cited

U.S. PATENT DOCUMENTS

| | | | |
|---|---|---|---|
| 5,159,593 | A | 10/1992 | D'Amico et al. |
| 5,774,658 | A | 6/1998 | Kalkunte et al. |
| 7,519,082 | B2 | 4/2009 | Quigley et al. |
| 2004/0136334 | A1 | 7/2004 | Heiman et al. |
| 2007/0126555 | A1 | 6/2007 | Bandy |
| 2007/0276955 | A1 | 11/2007 | Edsberg |
| 2009/0296629 | A1 | 12/2009 | Lincoln et al. |

OTHER PUBLICATIONS

International Search Report dated Aug. 30, 2010 in PCT/US10/40034 Filed Jun. 25, 2010.

*Primary Examiner* — Huy D Vu
*Assistant Examiner* — Kevin Cunningham
(74) *Attorney, Agent, or Firm* — Oblon, McClelland, Maier & Neustadt, L.L.P.

(57) ABSTRACT

An apparatus and method of communication in a network includes a hub having a burst time plan generating section to generate a burst time plan including time slot allocation information that allocated transmission time slots in a subsequent frame to remote terminals. The allocation information identifies at least one time slot in the subsequent frame as a dummy time slot assigned to at least one remote terminal already acquired in the network. The hub also includes a transmitter to transmit the burst time plan including the allocation information. A corresponding remote terminal and computer readable media are also discussed.

20 Claims, 8 Drawing Sheets

| 301 | 302 | 303 | 300 | 304 | 305 |
|---|---|---|---|---|---|
| Slot | Time | Remote Terminal | | Type | Other |
| 0 | x | open (to remotes outside network) | | real acquisition | |
| 1 | x+350μs | 1 | | dummy acquisition | offset instructions |
| 2 | x+700μs | 1 | | data | |
| 3 | x+950μs | 2 | | data | |
| 4 | x+1.2ms | 3 | | data | |
| 5 | x+1.45ms | 2 and 3 | | dummy contention | |
| 6 | x+1.6ms | open (to remotes within network) | | real contention | |
| 7 | x+1.75ms | --- | | empty acquisition | |
| 8 | x+2.1ms | 1 and 3 | | dummy acquisition | offset instructions |
| 9 | x+2.45ms | --- | | empty contention | |

APPARATUS AND METHOD TO SECURE ACQUISITION AND CONTENTION BURST ACTIVITY IN A COMMUNICATION NETWORK

CROSS-REFERENCE TO RELATED APPLICATIONS

This application is a continuation of and claims the benefit of priority from U.S. Ser. No. 13/806,937, filed Mar. 21, 2013, which is a National Stage application of PCT/US10/40034, filed Jun. 25, 2010, the entire contents of each of which are incorporated herein by reference.

BACKGROUND OF THE INVENTION

Field of the Invention

The present invention relates generally to an apparatus and method for improved security for acquisition and contention burst activity in a communication network.

Description of the Related Art

A hub in a communication network may broadcast a burst time plan with allocation information for each time slot in a subsequent frame transmitted by remote terminals. The contents of the burst time plan transmitted by the hub and the contents of the subsequent frame transmitted by remote terminals may be encrypted to prevent an eavesdropper from accessing the communication content. However, encryption of the communication content may not prevent someone from detecting communication patterns of the network.

Techniques to hide traffic patterns are referred to as Transmission security (TRANSEC) techniques. These techniques include encrypting addressing information and filling otherwise empty data time slots with encrypted dummy traffic.

TRANSEC techniques are of particular interest in satellite communication because of the extensive coverage of the communications that make it more susceptible to interception at relatively longer distances from the source.

In a time division multiple access (TDMA) system or other related system with multiple remote terminals and multiple carriers of a given frequency and bandwidth divided into different time slots, time slot assignments may be broadcast to instruct the remote terminals to transmit a communication signal or burst response into their respectively assigned slots (sometimes referred to as "bursting into the time slot") in the subsequent frame time.

SUMMARY OF THE INVENTION

One object of this invention is to provide a novel hub in a communication network comprising a burst time plan generating section to generate a burst time plan including time slot allocation information that allocates transmission time slots in a subsequent frame to remote terminals, the allocation information identifying at least one time slot in the subsequent frame as a dummy acquisition time slot assigned to at least one remote terminal already acquired in the network, and a transmitter to transmit the burst time plan including the allocation information.

Another object of this invention is to provide a novel hub in a communication network comprising a burst time plan generating section to generate a burst time plan including time slot allocation information that allocates transmission time slots in a subsequent frame to remote terminals, the allocation information identifying at least one of the time slots in the subsequent frame as one of three types of acquisition time slots and the allocation information identifying at least another one of the time slots in the subsequent frame as including one of the three types of acquisition time slots, the three types of acquisition time slots being a real acquisition time slot, a dummy acquisition time slot, and an empty acquisition time slot, wherein the at least one of the time slots and the at least another one of the time slots are not identified as a same type of acquisition time slot, and a transmitter to transmit the burst time plan including the time slot allocation information.

Another object of this invention is to provide a novel remote terminal communicating in a communication network comprising a receiver configured to receive a burst time plan from a hub, the burst time plan including time slot allocation information that allocates transmission time slots in a subsequent frame to remote terminals, the allocation information identifying a dummy acquisition time slot in the subsequent frame as being assigned to the remote terminal, and a transmitter configured to transmit in the dummy acquisition time slot in the subsequent frame.

Another object of this invention is to provide a novel hub in a communication network comprising a burst time plan generating section to generate a burst time plan including time slot allocation information that allocates transmission time slots in a subsequent frame to remote terminals, the allocation information identifying at least one time slot in the subsequent frame as a dummy contention time slot assigned to at least one remote terminal in the network and instructing the at least one remote terminal to transmit dummy data in the dummy contention time slot in the subsequent frame, and a transmitter to transmit the burst time plan including the allocation information.

Another object of this invention is to provide a novel hub in a communication network comprising a burst time plan generating section to generate a burst time plan including time slot allocation information that allocates transmission time slots in a subsequent frame to remote terminals, the allocation information identifying at least one of the time slots in the subsequent frame as one of three types of contention time slots and the allocation information identifying at least another one of the time slots in the subsequent frame as being one of the three types of contention time slots, the three types of contention time slots including a real contention time slot, a dummy contention time slot, and an empty contention time slot, wherein the at least one of the time slots and the at least another one of the time slots are not identified as a same type of contention time slot, and a transmitter to transmit the burst time plan including the allocation information.

Another object of this invention is to provide a novel remote terminal communicating in a communication network comprising a receiver configured to receive a burst time plan from a hub, the burst time plan including time slot allocation information that allocates transmission time slots in a subsequent frame to remote terminals, the allocation information instructing the remote terminal to transmit dummy data in a dummy contention slot in the subsequent frame, and a transmitter configured to transmit the dummy data in the dummy contention slot in the subsequent frame.

Another object of this invention is to provide a novel method of communicating in a communication network comprising generating a burst time plan including time slot allocation information that allocates transmission time slots in a subsequent frame to remote terminals, the allocation information identifying at least one time slot in the subsequent frame as a dummy acquisition time slot assigned to a remote terminal already acquired in the network, and transmitting the burst time plan including the allocation information.

Another object of this invention is to provide a novel method of communicating in a communication network comprising generating a burst time plan including time slot allocation information that allocates transmission time slots in a subsequent frame to remote terminals, the allocation information identifying at least one of the time slots in the subsequent frame as one of three types of acquisition time slots and the allocation information identifying at least another one of the time slots in the subsequent frame as including one of the three types of acquisition time slots, the three types of acquisition time slots being a real acquisition time slot, a dummy acquisition time slot, and an empty acquisition time slot, wherein the at least one of the time slots and the at least another one of the time slots are not identified as a same type of acquisition time slot, and transmitting the burst time plan including the time slot allocation information.

Another object of this invention is to provide a novel method of communicating in a communication network comprising receiving a burst time plan, the burst time plan including time slot allocation information that allocates transmission time slots in a subsequent frame to remote terminals, the allocation information identifying a dummy acquisition time slot in the subsequent frame as being assigned to a remote terminal, and the remote terminal transmitting in the dummy acquisition time slot in the subsequent frame.

Another object of this invention is to provide a novel method of communicating in a communication network comprising generating a burst time plan including time slot allocation information that allocates transmission time slots in a subsequent frame to remote terminals, the allocation information identifying at least one time slot in the subsequent frame as a dummy contention time slot assigned to at least one remote terminal in the network and instructing the at least one remote terminal to transmit dummy data in the dummy contention time slot in the subsequent frame, and transmitting the burst time plan including the allocation information.

Another object of this invention is to provide a novel method of communicating in a communication network comprising generating a burst time plan including time slot allocation information that allocates transmission time slots in a subsequent frame to remote terminals, the allocation information identifying at least one of the time slots in the subsequent frame as one of three types of contention time slots and the allocation information identifying at least another one of the time slots in the subsequent frame as being one of the three types of contention time slots, the three types of contention time slots including a real contention time slot, a dummy contention time slot, and an empty contention time slot, wherein the at least one of the time slots and the at least another one of the time slots are not identified as a same type of contention time slot, and transmitting the burst time plan including the allocation information.

Another object of this invention is to provide a novel method of communicating in a communication network comprising receiving a burst time plan from a hub, the burst time plan including time slot allocation information that allocates transmission time slots in a subsequent frame to remote terminals, the allocation information instructing at least one remote terminal to transmit dummy data in a dummy contention slot in the subsequent frame, and the at least one remote terminal transmitting the dummy data in the dummy contention slot in the subsequent frame.

Another object of this invention is to provide a novel hub in a communication network comprising a burst time plan generation means for generating a burst time plan including time slot allocation information that allocates transmission time slots in a subsequent frame to remote terminals, the allocation information identifying at least one of the time slots in the subsequent frame as one of three types of acquisition time slots and the allocation information identifying at least another one of the time slots in the subsequent frame as including one of the three types of acquisition time slots, the three types of acquisition time slots being a real acquisition time slot, a dummy acquisition time slot, and an empty acquisition time slot, wherein the at least one of the time slots and the at least another one of the time slots are not identified as a same type of acquisition time slot, and a transmitter to transmit the burst time plan including the time slot allocation information.

Another object of this invention is to provide a novel hub in a communication network comprising a burst time plan generation means for generating a burst time plan including time slot allocation information that allocates transmission time slots in a subsequent frame to remote terminals, the allocation information identifying at least one of the time slots in the subsequent frame as one of three types of contention time slots and the allocation information identifying at least another one of the time slots in the subsequent frame as being one of the three types of contention time slots, the three types of contention time slots including a real contention time slot, a dummy contention time slot, and an empty contention time slot, wherein the at least one of the time slots and the at least another one of the time slots are not identified as a same type of contention time slot, and a transmitter to transmit the burst time plan including the allocation information.

Another object of this invention is to provide a novel computer-readable storage medium storing, therein, a set of instructions that, when executed by a processor, cause a hub in a communication system to perform a method comprising generating a burst time plan including time slot allocation information that allocates transmission time slots in a subsequent frame to remote terminals, the allocation information identifying at least one of the time slots in the subsequent frame as one of three types of contention time slots and the allocation information identifying at least another one of the time slots in the subsequent frame as being one of the three types of contention time slots, the three types of contention time slots including a real contention time slot, a dummy contention time slot, and an empty contention time slot, wherein the at least one of the time slots and the at least another one of the time slots are not identified as a same type of contention time slot, and transmitting the burst time plan including the allocation information.

Another object of this invention is to provide a novel computer-readable storage medium storing, therein, a set of instructions that, when executed by a processor, cause a remote terminal in a communication system to perform a method comprising receiving a burst time plan from a hub, the burst time plan including time slot allocation information that allocates transmission time slots in a subsequent frame to remote terminals, the allocation information instructing the remote terminal to transmit dummy data in a dummy contention slot in the subsequent frame, and transmitting the dummy data in the dummy contention slot in the subsequent frame.

Another object of this invention is to provide a novel communication system comprising a hub comprising a burst time plan generating section to generate a burst time plan including time slot allocation information that allocates transmission time slots in a subsequent frame to remote terminals, the allocation information identifying at least one time slot in the subsequent frame as a dummy acquisition time slot assigned to at a remote terminal already acquired in the network, and a transmitter to transmit the burst time plan including the allocation information; and the remote terminal comprising a receiver configured to receive the burst time plan from the hub, the burst time plan including time slot allocation information that allocates transmission time slots in the subsequent frame to remote terminals, the allocation information identifying a dummy acquisition time slot in the subsequent frame as being assigned to the remote terminal, and a transmitter configured to transmit in the dummy acquisition time slot in the subsequent frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

If every time slot were used in every frame, encryption of the addressing portion and the contents of the bursts in a frame might be sufficient to prevent an unauthorized eavesdropper from gleaning any information from the frames.

Certain classes of assigned time slots may not always be filled with a burst in each frame, and an eavesdropper may be able to extract some information from these time slots. Two of these classes are: acquisition time slots and contention time slots.

Figure 3A:
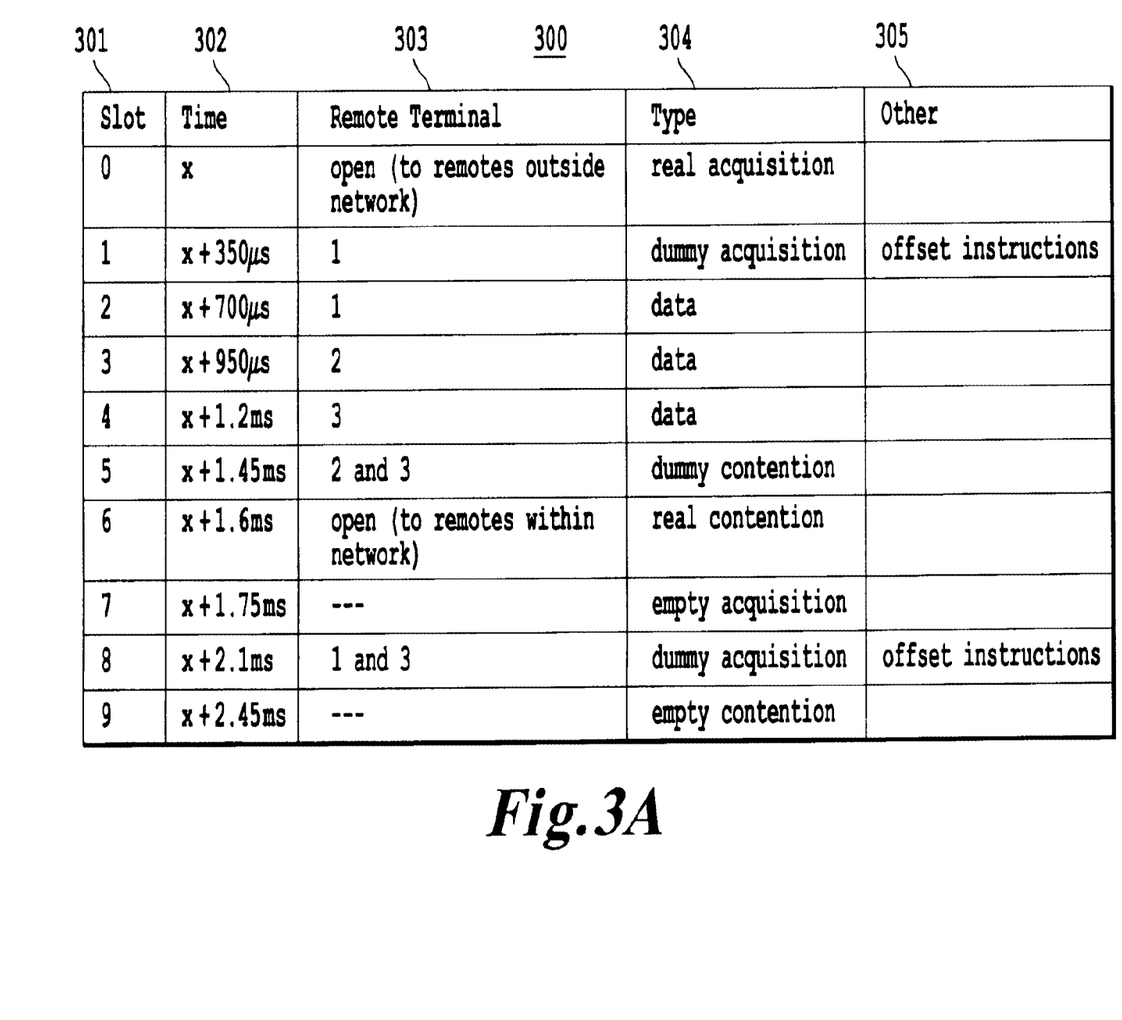
FIG. 3*a* is an exemplary burst time plan generated by a hub in a communication network according to an embodiment of the present invention.
Figure 3B:
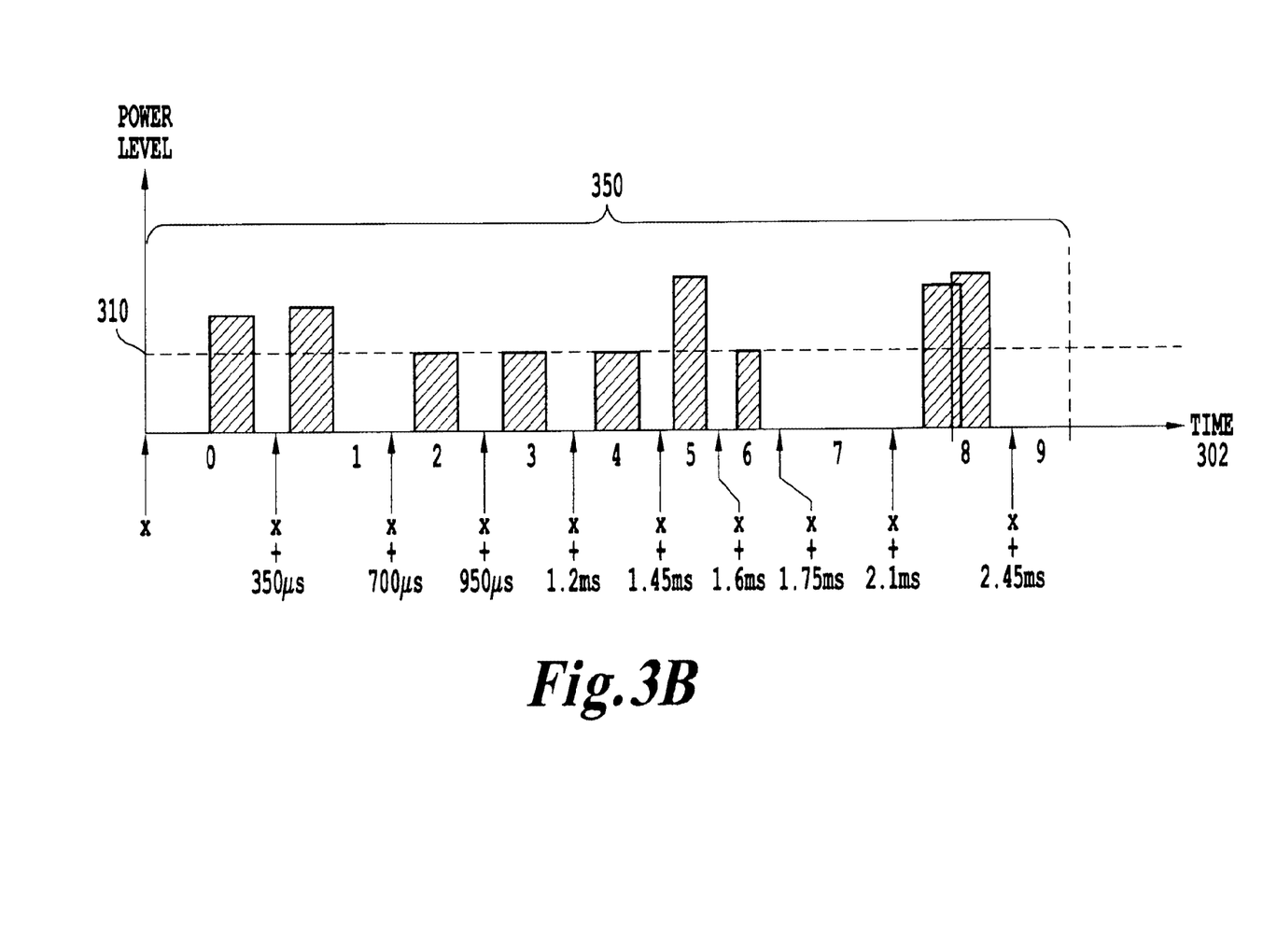
FIG. 3*b* is an exemplary subsequent frame showing burst transmissions, including time and power level offsets, transmitted by remote terminals in a communication network based on the burst time plan shown at FIG. 3*a*, according to an embodiment of the present invention.
Figure 3C:
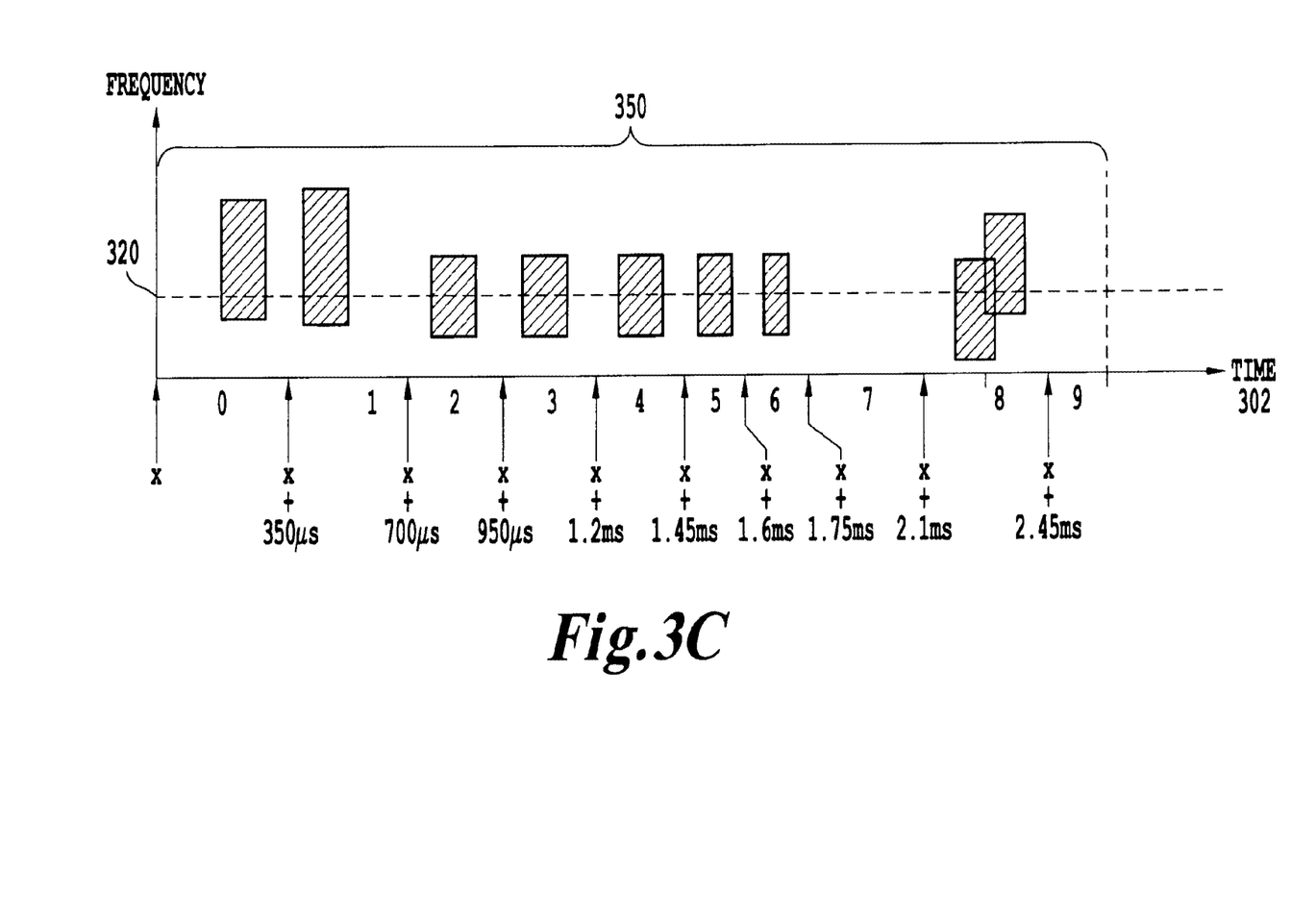
FIG. 3*c* is an exemplary subsequent frame showing burst transmissions, including time and frequency offsets, transmitted by remote terminals in a communication network based on the burst time plan shown at FIG. 3*a*, according to an embodiment of the present invention.

Acquisition time slots are time slots in a frame that are normally set aside for new remote terminals, not already joined in the network, to burst into a frame as a way to logon to the network. Acquisition time slots may be specifically assigned to one or more remote terminals outside the network or set up as contention time slots available to any remote terminal logging into the network. As shown at FIGS. 3*a*-3*c*, for example, acquisition time slots are typically longer than data time slots. Acquisition time slots also typically have a large guard time (i.e. a reserved time period on either side of the time slot in which transmission is normally prohibited) to allow for timing uncertainty, for example, due to satellite motion and uncertainty in the location of the remote terminal. Once a remote terminal bursts into the acquisition time slot, timing, power level, and frequency offset corrections may be sent to the remote terminal to control subsequent data bursts in subsequent frames.

Because of the timing inaccuracy that is typical of acquisition bursts, they may be easily distinguishable from data bursts. Additionally, when no remote terminal bursts into an available acquisition time slot, the absence of a burst in a time slot allocated as an acquisition time slot may be apparent to an eavesdropper. Thus, while an eavesdropper may not be able to determine which remote terminals are joining the network due to encryption, he may be able to ascertain whether and in what numbers new remote terminals are joining the network. This type of information regarding patterns of activity may provide useful information to an eavesdropper.

Contention slots present a similar issue in TRANSEC systems. A contention time slot is typically available to more than one remote terminal in a network to burst in with data. Contention time slots may be allocated for two or more specified remote terminals in the network or may be indicated as available to any remote terminal in the network. As shown at FIGS. 3*a*-3*c*, for example, a contention time slot may be shorter in duration than a data time slot and, thus, like an acquisition time slot, may be recognizable to an eavesdropper based on its different duration.

Because two or more remote terminals may try to use the same contention time slot, a "collision" is possible. A collision results in a higher power level in the signal received at the satellite in that contention time slot. Thus, an eavesdropper may also be able to identify contention time slots based on the higher power level. So, while an eavesdropper may not be able to determine which remote terminals are using contention time slots due to encryption, he may be able to ascertain the level of traffic activity in a network by observing the number of filled contention time slots.

Figure 1:
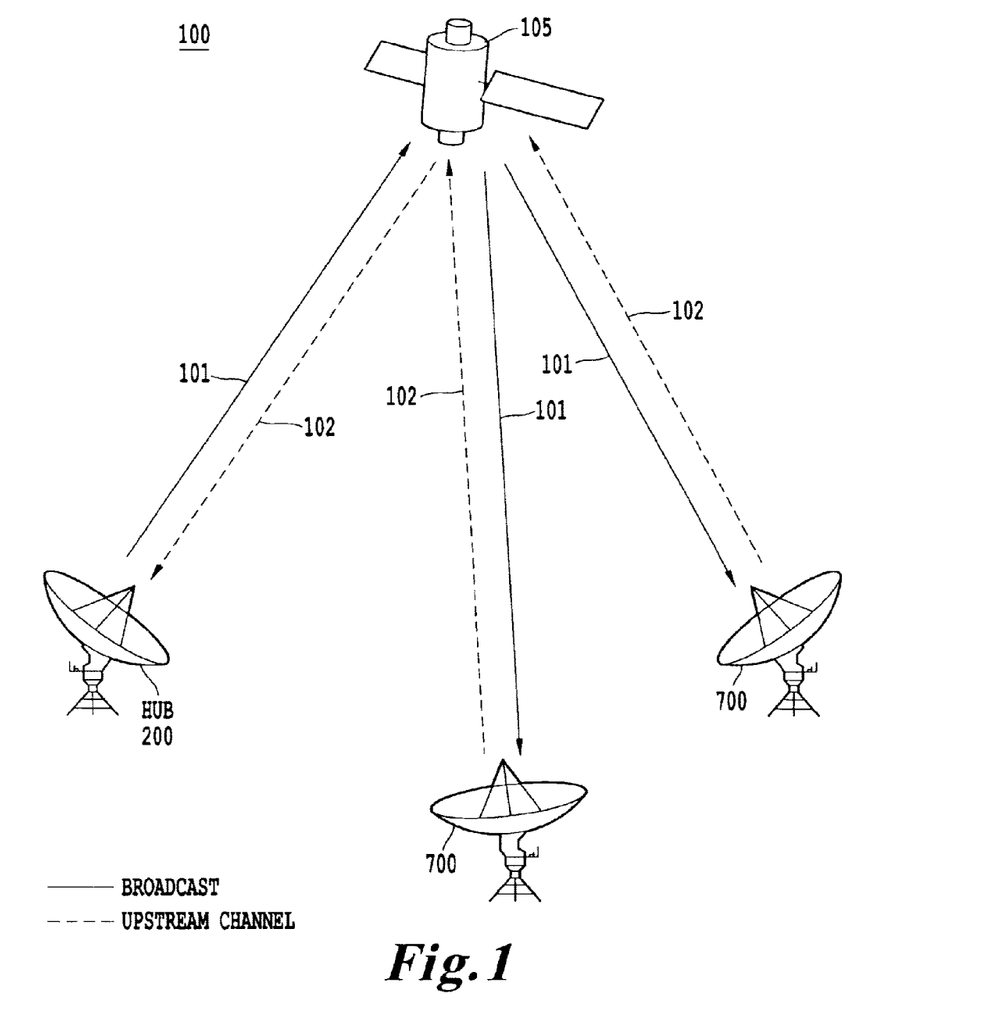
FIG. 1 shows a communication network according to an embodiment of the present invention.

FIG. 1 shows a communication network 100 according to an embodiment of the present invention. A hub 200 may transmit a burst time plan to a satellite 105 using channel 101. One or more remote terminals 700 that receive the burst time plan from the hub 200 via the satellite 105 may burst into a subsequent frame resulting from the burst time plan using the upstream channel 102 based on whether the allocation information in the burst time plan assigned one or more transmission time slots to one or more of the remote terminals 700.

Figure 2:
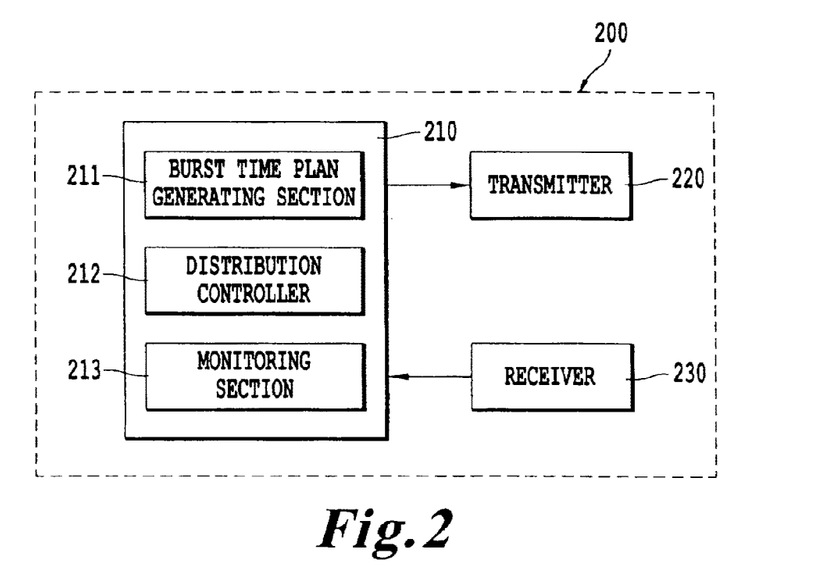
FIG. 2 is a block diagram of a hub of a communication network according to an embodiment of the present invention.

FIG. 2 is a block diagram of a hub 200 of a communication network according to an embodiment of the present invention. The hub 200 comprises a processing section 210, which includes a burst time plan generating section 211, a distribution controller 212, and a monitoring section 213, a transmitter 220, and a receiver 230.

One of ordinary skill in the design of communication systems understands that the processing section 210 includes numerous elements necessary for the normal function of a communication hub that are not shown here because they not necessary to further the descriptions herein. Further, one of ordinary skill understands that the processing section 210 may be implemented in both hardware and software embodiments. The software implementation may include at least a memory (e.g., ROM, EPROM, EEPROM, flash memory, static memory, DRAM, SDRAM, and their equivalents) to store program instructions and at least one processor/microprocessor to execute the instructions.

The burst time plan generating section 211 generates a burst time plan. The burst time plan includes time slot allocation information that allocates transmission time slots in a subsequent frame to remote terminals. The burst time plan may include time slot allocation information for every carrier of a given frequency and bandwidth in the network.

In a non-limiting embodiment, the burst time plan generating section 211 generates a burst time plan that may include time slot allocation information instructing remote terminals whether and when to communicate in a subsequent frame and identifying a type of communication for each allocated time slot.

For example, the burst time plan may identify some time slots for normal data transfer and other time slots to be used for acquisition time slots, to allow remote terminals to send acquisition transmissions requesting permission to join the network. According to an embodiment of the present invention, there may be different types of acquisition time slots identified by the allocation information in a burst time plan. The different types of acquisition time slots may include a real acquisition time slot, a dummy acquisition time slot, and an empty acquisition time slot.

A real acquisition time slot is a time slot that is available to remote terminals that are not already joined in the network to join the network. For example, a remote terminal that wants to join the communication network may receive the burst time plan broadcast by the hub, determine from the burst time plan when a real acquisition time slot is allocated, and then transmit a request to join the network during the allocated real acquisition time slot of a corresponding subsequent frame.

The dummy acquisition time slot is a time slot assigned to at least one remote terminal that is already acquired in the network. A burst time plan may include a time slot assignment of a dummy acquisition time slot to one or more remote terminals that have already joined the network. The time slot assignment instructs the one or more remote terminals to transmit a dummy (e.g., burst constructed to mimic a request, noise, etc.) request to join the network during the allocated dummy acquisition time slot of a corresponding subsequent frame. When a dummy acquisition time slot is allocated to more than one remote terminal that has already joined the network, a "collision" or acquisition contention can be mimicked.

In a non-limiting embodiment, when the burst time plan generating section 211 generates a burst time plan with allocation information that allocates at least one time slot in a subsequent frame as a dummy acquisition time slot, the burst time plan generating section 211 includes at least one of a timing offset instruction, a frequency offset instruction, and a power level offset instruction in the allocation information. The timing offset instruction, frequency offset instruction, and power level offset instruction instruct the remote terminal that is allocated the dummy acquisition time slot to include offsets, based on the corresponding instructions, in the timing, frequency, and power level of the resulting dummy burst in a subsequent frame.

In a non-limiting embodiment, the timing offset instructions, frequency offset instructions, and power level offset instructions are based on a predetermined range or a predetermined distribution for each corresponding offset value.

In a non-limiting embodiment, a monitoring section 213 monitors network conditions and provides measured timing error, frequency error, and/or power level error values to the burst time plan generating section 211. The burst time plan generating section 211 generates at least one of the timing offset instruction, frequency offset instruction, and power level offset instruction based on the measured error values provided by the monitoring section 213.

Also, based on the monitoring section 213, the distribution of at least one of a generated timing offset instruction, frequency offset instruction, and power level offset instruction may be varied over time.

The empty acquisition time slot is a time slot that is not available to any remote terminal inside or outside the network. A burst time plan that identifies a time slot as an empty acquisition time slot thereby instructs all remote terminals to refrain from sending any burst transmissions during the allocated empty acquisition time slot of a corresponding subsequent frame.

In a non-limiting embodiment, the burst time plan generating section 211 that generates a burst time plan that may include time slot allocation information instructing remote terminals whether and when to communicate in a subsequent frame may identify a type of communication for each allocated time slot that also includes different types of contention time slots. The different types of contention time slots include a real contention time slot, a dummy contention time slot, and an empty contention time slot.

A real contention time slot is a time slot that is available to two or more remote terminals in the network to transmit real data. For example, two or more remote terminals in the network may receive the burst time plan including time slot allocation information that indicates a time slot as a real contention time slot and transmit data in the allocated time slot in a corresponding subsequent frame.

A dummy contention time slot is a time slot assigned to one or more remote terminals in the network along with an instruction to transmit dummy data in the dummy contention time slot. By assigning a dummy contention time slot to two or more remote terminals, a hub can use the burst time plan to include time slot allocation information that creates an appearance of a real contention (i.e. collision) in a corresponding subsequent frame in the time slot allocated as a dummy contention time slot.

A burst time plan that identifies a time slot as an empty contention time slot thereby instructs all remote terminals to refrain from sending any burst transmissions during the allocated empty contention time slot of the resultant frame.

FIG. 3a is an exemplary burst time plan 300 generated by a hub in a communication network according to an embodiment of the present invention. A single carrier is shown to simplify the example. However, the invention also includes using a single burst time plan generated by the hub that includes allocation information for a plurality of carrier frequencies such that a corresponding subsequent frame would include bursts at allocated times for the respective plural carriers. Further, each carrier need not include the same numbers of each type of time slot, and the time slot timing and frame timing may vary amongst the carriers allocated by the burst time plan.

For each slot 301 in the subsequent frame, the burst time plan of this example may assign a time 302, a remote terminal 303, a type 304, and other information 305. The slot identifies the relative position of the time slot being assigned with other slots in the burst time plan 300. In this example, a frame having ten slots 301 (numbered as slots 0 to 9) is illustrated. However, frames having other numbers of time slots are also included in the scope of the invention.

The time assignment 302 in the burst time plan 300 indicates the time of the start of the allocated time slot, which bounds the time period when a corresponding burst from a remote terminal should be received. The duration of each time slot 301 extends from the time 302 of the start of the allocated slot until the start time of the next slot. Each slot 301 allocated in allocation information of the burst time plan 300 may correspond to an absolute time when a remote terminal may transmit, and that absolute time may be determined based on a master clock at the hub or may be based on other timing synchronization schemes known to those of skill in the art of satellite communication. Alternatively, time may also be indicated as a relative value. In this example, the time assignment 302 is provided as an absolute time (time x indicates an absolute time and offsets from absolute time x are shown). Additionally, in this example, contention time slots are allocated 150 μs; data time slots are allocated 250 μs; and acquisition time slots are allocated 350 μs. However, other time slot durations are also within the scope of the present invention.

The remote terminal assignment 303 identifies one or more remote terminals that are assigned to each corresponding slot. In this example, three remote terminals (1, 2, and 3) are already joined in the network.

The type assignment 304 indicates the type of slot allocated, and other field 305 provides other information that may be included in the time slot allocation information of the burst time plan, such as offset instructions (e.g., frequency offset instruction, timing offset instruction, and/or power level offset instruction) for the dummy acquisition type slots.

As noted above, a contention time slot is allocated to one or more remote terminals already joined in the network (already provided with corrections for timing, frequency, and power level offsets during the acquisition process). Thus, in a preferred embodiment, time, frequency, or power level offsets are not associated with dummy contention bursts as they are with dummy acquisition bursts.

In the example of FIG. 3a, the real acquisition time slot (i.e., slot 0) is open to remote terminals that have not already joined the network, while the real contention time slot (i.e., slot 6) is open to remote terminals that have already joined the network. However, real acquisition time slots and real contention time slots may also be assigned to one or more remote terminals explicitly. For example, a remote terminal not already joined in the network may use a control burst to request an acquisition time slot. In that case, an acquisition time slot in a subsequent frame may be specifically assigned to that requesting remote terminal. One or both of the real acquisition time slot (i.e., slot 0) and the real contention time slot (i.e., slot 6) could also result in an empty time slot in the subsequent frame. This is because the one or more remote terminals eligible to use the real acquisition time slot or the real contention time slot may not burst into the time slot in the subsequent frame at all.

FIG. 3b is an exemplary subsequent frame 350 showing burst transmissions, including time and power level offsets, transmitted by remote terminals in a communication network based on the burst time plan shown at FIG. 3a, according to an embodiment of the present invention. Time is shown on the x axis and corresponds with the times 302 specified in the burst time plan 300 shown at FIG. 3a. In this example, a time offset is shown for real and dummy acquisition bursts as an offset from the center of the assigned slot, and slot 301 numbers are also noted on the x axis. The y axis is shown to correspond with power level; however, other methods of identifying the timing and power level of burst transmissions that are known to those of skill in the art are also within the scope of the invention. Real and dummy acquisition bursts in slot numbers 0, 1, and 8 and dummy contention bursts in the dummy contention slot number 5, have power levels that are greater than the nominal burst power level 310, thereby indicating an apparent "collision." In this example, slot number 5 is assigned as a dummy contention time slot and is assigned to two remote terminals in the network. Therefore, as shown at FIG. 3b, the power level at slot number 5 is double the nominal power level 310.

FIG. 3c is an exemplary subsequent frame 350 showing burst transmissions, including time and frequency offsets, transmitted by remote terminals in a communication network based on the burst time plan shown at FIG. 3a, according to an embodiment of the present invention. Time is shown on the x axis and corresponds to the times specified in the burst time plan shown at FIG. 3a. As in FIG. 3b, a time offset is shown for real and dummy acquisition bursts as an offset from the center of the assigned slot, and slot 301 numbers are also noted on the x axis. The y axis is shown to correspond with frequency. However, other methods of identifying the timing and frequency of burst transmissions that are known to those of skill in the art are also within the scope of the invention. In this example, real and dummy acquisition bursts in slot numbers 0, 1, and 8 are shown to have frequencies offsets from a nominal frequency 320.

The distribution controller 212 shown at FIG. 2 controls the probability that a particular acquisition time slot is assigned to be one of the different types of acquisition time slots and contention time slots allocated through the time slot allocation information in the burst time plan.

The following example discusses control of the distribution of acquisition time slots, but the invention also includes performing similar distribution control for contention time slots. Also, because the burst time plan and the frame resulting from the burst time plan have been detailed above, the discussion of the distribution controller 212 and the distribution of the different types of acquisition time slots will focus on depictions of the distributions only.

The distribution controller 212 may control the probability distribution of the three types of acquisition time slots to be static over a predetermined period of time. For example, a static probability distribution may be:

TABLE 1

|  | Dummy acquisition slot probability | Real acquisition slot probability | Empty acquisition slot probability |
|---|---|---|---|
| Static distribution | ½ | ¼ | ¼ |

According to one embodiment, the distribution controller 212 determines the static distribution and provides the static distribution to the burst time plan generating section 211, which generates the burst time plan according to the static distribution. Thus, according to the example of Table 1, over a given period of time (e.g., during a given number of subsequent frames) the probability that a particular acquisition time slot in the burst time plan will be allocated by the burst time plan generating section 211 to be a dummy acquisition slot is 50%, the probability that a particular acquisition slot in the burst time plan will be allocated as a real acquisition time slot is 25%, and the probability that a particular acquisition time slot in the burst time plan will be allocated as an empty acquisition time slot is 25%. Static probability distribution, as shown at Table 1, for example, may be acceptable for security purposes when real bursts in real acquisition time slots are relatively rare compared with the number of total acquisition time slots.

However, a static probability distribution of acquisition type time slots may be vulnerable to long-term analysis when the number of real acquisition bursts reaches a relatively high value, because the variance in the number of dummy acquisition bursts may become small in comparison to the number of real acquisition bursts. Thus, a constant rate of acquisitions may be detected by an eavesdropper by summing the number of observed bursts (real and dummy) over a long enough period of time. That period of time may be long enough for practical security purposes when the real bursts are sufficiently small in number.

Similarly, patterns of control transmissions (to provide correction values for timing, frequency, and power level offsets to a newly joined remote terminal, for example) that exist for a limited period during acquisition of a remote terminal into the network may be obscured by filling all slots with real or dummy transmissions.

To address a potential vulnerability of a static probability distribution of the three types of acquisition time slots, according to an alternative embodiment of the present invention, the static probability distribution function implemented by the distribution controller 212 may be dynamically adjusted by adjusting the probability of an acquisition time slot being a dummy acquisition time slot or an empty acquisition time slot based on the number of real acquisition bursts that are detected in previous frames. The adjustment may offer resistance to observations of the acquisition pattern over long periods of time. According to this alternative embodiment, the burst time plan generating section 211 receives the dynamically varied probability distributions generated by the distribution controller 212, and the burst time plan generating section 211 generates burst time plans with allocations according to the dynamically varied probability distributions.

One example of a dynamically adjusted static distribution is shown in Table 2, where the static distribution is varied by a number M of real bursts detected in a predetermined number of previous frames, and a number N, which is set by an administrator and corresponds to the total number of acquisition time slots in a given period of time.

According to this example, the distribution controller 212 may include plural timers. One timer may be set for each real burst detected during a preceding time period (e.g., during a predetermined number of previous frames) such that M timers may be concurrently running. Each timer counts down from N for each acquisition time slot of one of the three kinds allocated by the burst time plan.

TABLE 2

|  | Dummy acquisition slot probability | Real acquisition slot probability | Empty acquisition slot probability |
|---|---|---|---|
| Dynamically adjusted static distribution | ½ − M/N | ¼ | ¼ + MN |

In this example, the probability that an acquisition time slot is allocated to be a dummy acquisition time slot in subsequent burst time plans decreases based on the ratio of M to N, while the probability that an acquisition time slot is allocated to be an empty acquisition time slot increases based on the ratio of M to N.

If there are too many real bursts too soon, M exceeds N, and the formula may break down. That is, M/N would be greater than 1. However, by selecting a sufficiently large N value such that N>M, the problem can be avoided.

If the probability of detecting a real burst is less than 1 ($\rho$), then the distribution function may be further adjusted as: ($½−(M/N)/(\rho)$) for dummy acquisition time slots; ¼ for real acquisition time slots; and ($¼+(M/N)/(\rho)$) for empty acquisition time slots.

In a non-limiting embodiment, a suitable value of $\rho$ may be ascertained from analysis of the system design and configuration. For example, where there is a substantial frequency offset uncertainty in the transmission from a remote terminal which exceeds the tolerance of the receiver at the hub, an acquisition approach may be used that involves a number of trial transmissions using frequency values at intervals corresponding to the receiver's tolerance. In this example, $\rho$ may be determined as a ratio of the receiver's frequency offset tolerance to the total frequency uncertainty.

In a non-limiting embodiment, the value of $\rho$ may be determined at the hub based on actual acquisition bursts transmitted in the network. For example, each acquisition burst from a remote terminal may include a counter. By incrementing the counter each time the remote terminal transmits an acquisition burst, the remote terminal can communicate the number of acquisition burst transmissions to the hub. Based on the counter, the hub may identify undetected bursts and determine $\rho$ as the ratio of detected real acquisition bursts to transmitted real acquisition bursts.

In another non-limiting embodiment, the value of $\rho$ may be reported to the hub by each remote terminal in a data burst following completion of the acquisition process of the remote terminal.

Figure 4:
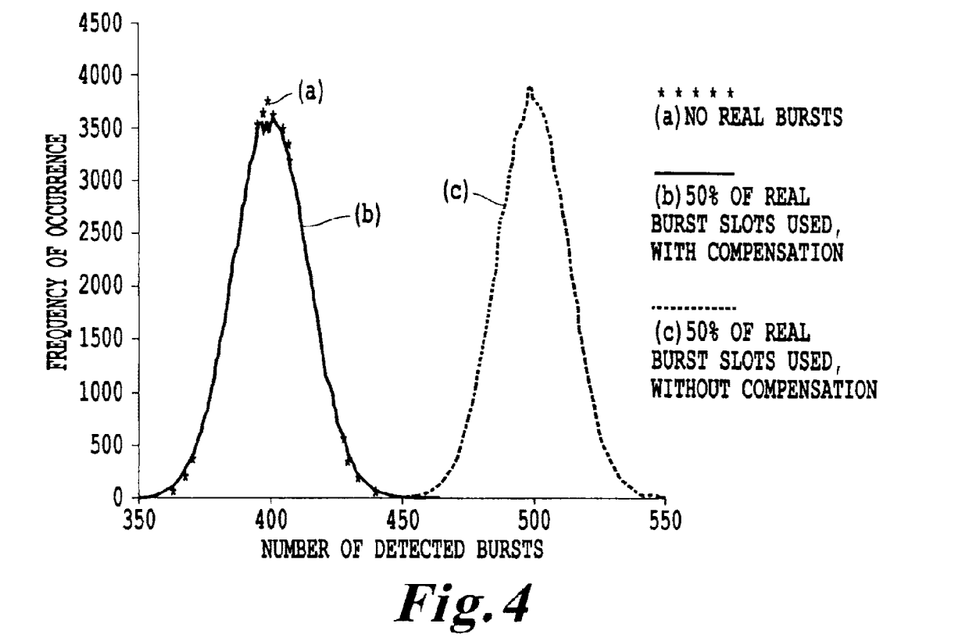
FIG. 4 is a histogram of frequency of occurrence and number of detected bursts showing the effect of dynamically adjusting a probability of an acquisition slot being a dummy acquisition slot.

FIG. 4 shows an example of the effect of dynamically adjusting a probability of an acquisition slot being a dummy acquisition slot or an empty acquisition time slot in allocations by subsequent burst time plans. In this example of 23,000 groups with 800 acquisition slots, the distribution of the number of detected acquisition bursts (real and dummy) in the frames resulting from the burst time plans is shown for three scenarios: (a) no real bursts (only dummy bursts); (b) 50% of real acquisition time slots resulted in real bursts with dynamic adjustment of the number of dummy acquisition time slot allocations (N=480); and (c) 50% of real acquisition time slots resulted in real bursts and no dynamic adjustment was performed.

As shown by FIG. 4, the curve for scenarios (a) and (b) are indistinguishable (i.e., no real acquisition bursts and 50% of real acquisition time slots resulted in real bursts with dynamic adjustment of the number of dummy acquisition time slots). Thus, an eavesdropper would find it difficult to distinguish scenarios (a) and (b).

On the other hand, from the curve for scenario (c), the case where 50% of real acquisition time slots resulted in real bursts and with no dynamic adjustment of the acquisition time slot allocations in subsequent burst time plans, the distribution result shown by the histogram at FIG. 4, particularly the shift in the peak, might indicate to an eavesdropper that, in a network with 800 acquisition time slots, more than 450 bursts were detected much of the time. This may indicate that at least some acquisition activity was occurring.

A static probability distribution may result in the distribution of the number of dummy acquisition bursts in a given period converging to a Gaussian distribution. The standard deviation of the Gaussian may provide the approximate number of real acquisition bursts that could be hidden in a given period of time. By varying the probability of distribution of the three types of acquisition time slots randomly, the standard deviation may be made substantially larger for a given period of time, thereby increasing the number of real acquisition bursts that could be hidden in the period of time.

An exemplary first distribution of acquisition time slots allocated during a first time period and an exemplary second distribution of acquisition time slots allocated during a second time period are shown in Table 3.

TABLE 3

| | Dummy acquisition slot probability | Real acquisition slot probability | Empty acquisition slot probability |
|---|---|---|---|
| Distribution of acquisition slots for a first time period | ½ | ¼ | ¼ |
| Distribution of acquisitions slots for a second time period | ¼ | ¼ | ½ |

While the example in Table 3 shows the probability of real acquisition time slots as being held constant over the first and second time periods, in another example, only the probability of dummy acquisition time slots may be varied over the first and second time periods while the probability of both real and empty acquisition time slots is held constant or, as yet another example, the probability of both dummy and real acquisition time slots may be varied over the first and second time periods while the probability of empty acquisition time slots is held constant. The invention includes every variation of the probability of distribution of one or more types of acquisition time slots.

The dynamic adjustment described above with regard to the static probability distribution example could also be used in conjunction with a long term variation in the probability distribution of types of acquisition time slots, for example the variation occurring over the first and second time periods discussed with reference to Table 3.

Table 4, below, shows an exemplary dynamic adjustment of the first distribution and the second distribution shown at Table 3. Timers are set as described above with respect to the static probability distribution example, with reference to Tables 1 and 2, to result in the first adjusted distribution and the second adjusted distribution shown at Table 4, below:

TABLE 4

| | Dummy acquisition slot probability | Real acquisition slot probability | Empty acquisition slot probability |
|---|---|---|---|
| Dynamically adjusted distribution of acquisition slots for a first time period | ½ − M/N | ¼ | ¼ + M/N |
| Dynamically adjusted distribution of acquisition slots for a second time period | ¼ − M/N | ¼ | ½ + M/N |

The following technique may be used to select the probability distribution for a given time period. For example, first, the probability $P_d$ of an acquisition time slot being allocated as a dummy acquisition time slot may be selected as a random number. Next, the probability $P_e$ of an acquisition time slot being allocated as an empty acquisition time slot may be determined as $P_e = (1 - P_d - P_r)$, where $P_r$ is a fixed, predetermined probability of an acquisition time slot being allocated as a real acquisition time slot. The random number $P_d$ may be chosen between limits such as $P_{d,min} \leq P_d < (1 - P_{e,min} - P_r)$, where $P_{d,min}$ is a pre-determined minimum probability of an acquisition time slot being allocated as a dummy acquisition time slot and $P_{e,min}$ is a pre-determined minimum probability of an acquisition time slot being allocated as a real acquisition time slot. For example, if $P_{d,min} = 0.2$, $P_{e,min} = 0.15$ and $P_r = 0.25$, then $0.2 \leq P_d < 0.6$.

As another example, the probability $P_d$ of an acquisition time slot being allocated as a dummy acquisition time slot may be selected as a random number. Next, the probability $P_r$ of an acquisition time slot being allocated as a real acquisition time slot may be determined as $P_r = (1 - P_d - P_e)$, where $P_e$ is a fixed, pre-determined probability of an acquisition time slot being allocated as an empty acquisition time slot. The random number $P_d$ may be chosen between limits such that $P_{d,min} \leq P_d < (1 - P_{r,min} - P_e)$, where $P_{d,min}$ is a pre-determined minimum probability of an acquisition time slot being allocated as a dummy acquisition time slot and $P_{r,min}$ is a pre-determined minimum probability of an acquisition time slot being allocated as a real acquisition time slot. For example, if $P_{d,min} = 0.15$, $P_{r,min} = 0.1$ and $P_e = 0.25$, then $0.15 \leq P_d < 0.65$.

As noted above, the invention includes every variation of the technique described above. Thus, for example, both $P_r$ and $P_e$ may be fixed or only $P_d$ may be fixed in other non-limiting cases.

Figure 5A:
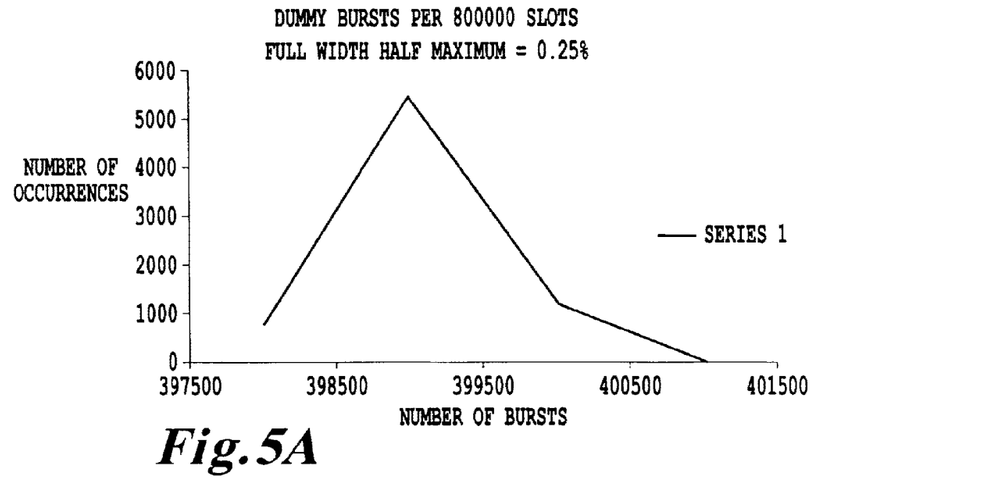
FIG. 5*a* is a histogram of the number of occurrences and number of bursts when a dummy acquisition time slot is allocated with a 50% probability.

FIG. 5a is a histogram showing a relative frequency of a given number of dummy bursts per 800,000 acquisition slots when a dummy acquisition time slot is allocated with a static 50% probability for 7800 groups of 800,000 acquisition time slots. The normalized standard deviation in this case is approximately 0.25%, indicating that approximately 0.25% of acquisition time slots over the 800,000 acquisition time slots may be hidden by the probability distribution used in this example.

Figure 5B:
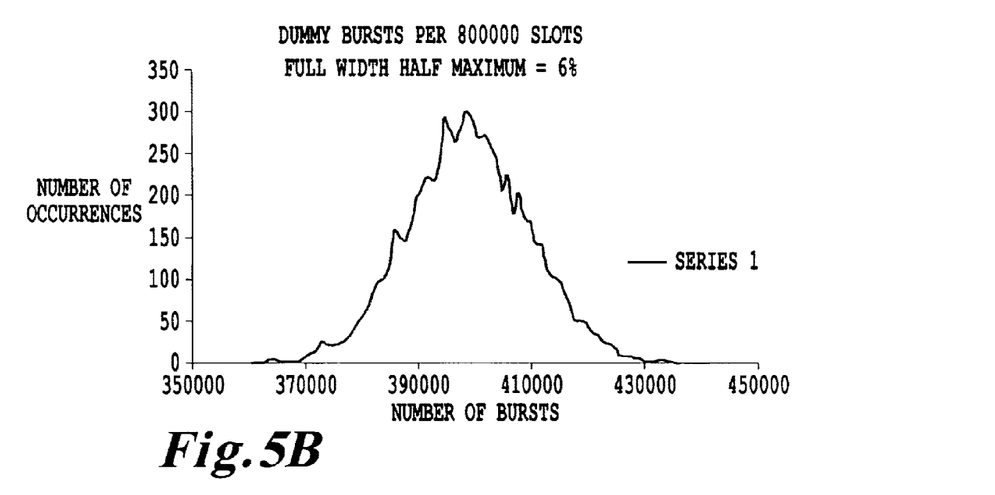
FIG. 5*b* is a histogram of the number of occurrences and number of bursts when a dummy acquisition time slot is allocated using a probability distribution with a large long term variation.

FIG. 5b is a histogram showing a relative frequency of a given number of dummy bursts per 800,000 acquisition slots when a dummy acquisition time slot is allocated using a large long term variation in the probability distribution of dummy acquisition slots for 7800 groups. FIG. 5b shows a wider range of expected number of dummy bursts. A higher variance (6% versus 0.25%) is exhibited by the histogram results of FIG. 5b. That is, by using the probability distribution with a large long term variation as shown in FIG. 5*b*, approximately 6% of acquisition time slots over the 800,000 acquisition time slots may advantageously be hidden.

The transmitter 220 shown at FIG. 2 transmits the burst time plan generated by the burst time plan generating section 211. The receiver 230 receives a corresponding subsequent frame transmitted by the remote terminals in accordance with the burst time plan.

Figure 6:
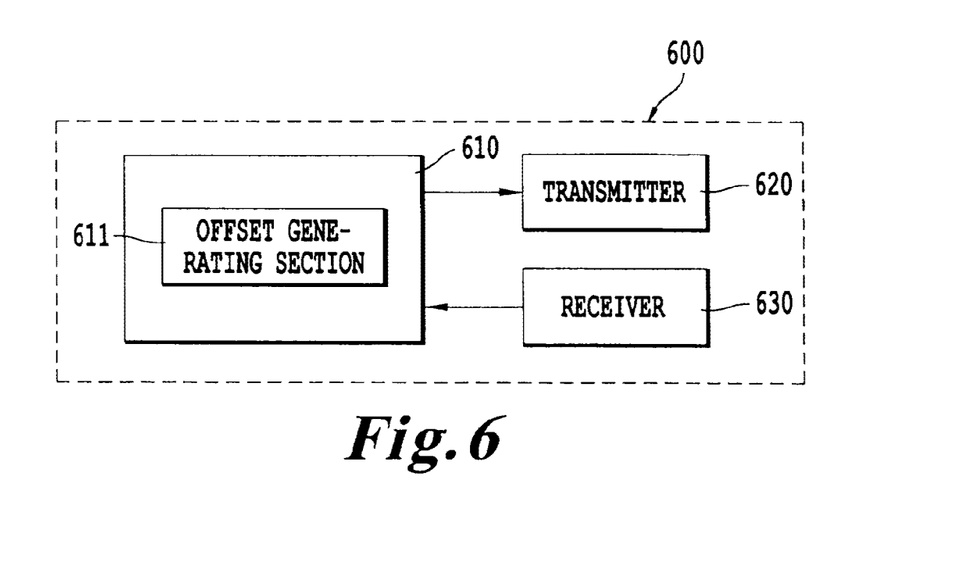
FIG. 6 is a block diagram of a remote terminal of a communication network according to an embodiment of the present invention.

FIG. 6 is a block diagram of a remote terminal of a communication network according to an embodiment of the present invention. The remote terminal includes a processing section 610, which includes an offset generating section 611, a transmitter 620, and a receiver 630.

The receiver 630 receives a burst time plan from a hub. The transmitter 620 transmits one or more bursts in a corresponding subsequent frame based on one or more time slots allocated to the remote terminal 600 in the received burst time plan.

One of ordinary skill in communication systems understands that the processing section 610 includes numerous elements necessary for the normal function of a remote terminal that are not shown here because they are not necessary to further the descriptions herein. Further, one of ordinary skill understands that the processing section 610 may be implemented in both hardware and software embodiments. The software implementation would include at least a memory (e.g., ROM, EPROM, EEPROM, flash memory, static memory, DRAM, SDRAM, and their equivalents) to store program instructions and at least one processor/microprocessor to execute the instructions.

In a non-limiting embodiment, the offset generating section 611 generates at least one of an offset value for timing, an offset value for frequency, and an offset value for power level based on a corresponding time offset instruction, frequency offset instruction, and power level offset instruction in the allocation information received in the burst time plan.

In a non-limiting embodiment, the offset generating section 611 generates at least one of an offset value for timing, an offset value for frequency, and an offset value for power level based on a predetermined range or a predetermined distribution for each corresponding offset value.

The offset values generated by the offset generating section 611 may be used by the remote terminal 600 to burst into a dummy acquisition time slot assigned to the remote terminal 600 by the allocation information in the burst time plan.

Figure 7:
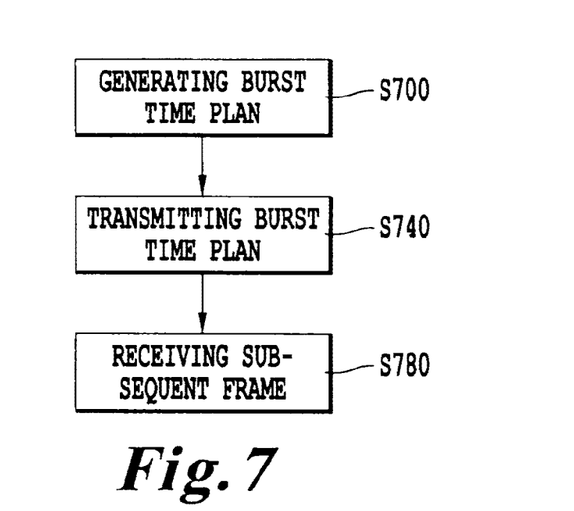
FIG. 7 is a flow diagram of a method of generating and transmitting a burst time plan and receiving a subsequent frame in a communication network according to an embodiment of the present invention.

FIG. 7 is a flow diagram of a method of generating and transmitting a burst time plan and receiving a corresponding subsequent communication frame in a communication network according to an embodiment of the present invention. Generating a burst time plan at S700 includes the steps shown at FIG. 8. After the burst time plan is generated at step S700, the transmitting step at S740 transmits the burst time plan. At step S780, the method includes receiving a subsequent frame generated by remote terminals bursting into the time slots identified and assigned by the burst time plan.

Figure 8:
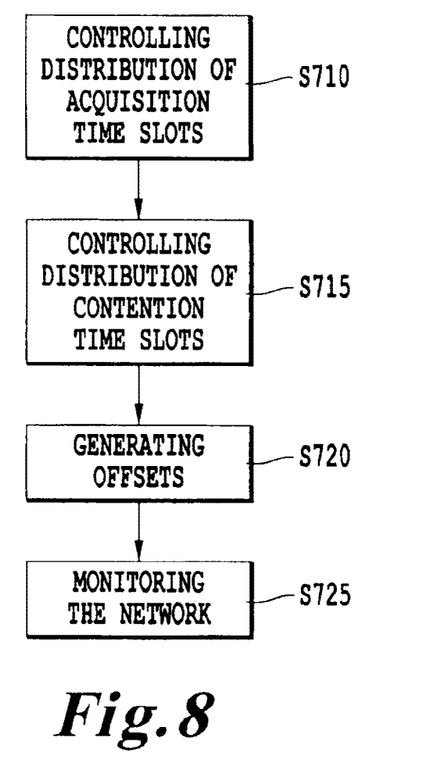
FIG. 8 is a flow diagram of a method of generating a burst time plan in a communication network according to an embodiment of the present invention.

FIG. 8 is a flow diagram of a method of generating a burst time plan in a communication network according to an embodiment of the present invention. The generating the burst time plan step at S700 includes controlling the distribution of three types of acquisition time slots at step S710, controlling the distribution of three types of contention time slots at step S715, generating offset instructions at step S720, and monitoring the network at step S725. The generating offset instructions step S720 includes generating at least one of a time offset instruction, a frequency offset instruction, and a power level offset instruction to be used in the transmission of a dummy burst in a dummy time slot allocated by the burst time plan.

In a non-limiting embodiment, generating offset instructions at S720 includes generating the offset values in each of the time, frequency, and power level instructions based on a predetermined range or predetermined distribution of values. In an alternative embodiment, the distribution on which the instructions are based may be based on observed offsets in received bursts, observed by monitoring the network at S725, for example, rather than being based on a predetermined distribution.

In a non-limiting embodiment, monitoring the network at S725 includes providing measured timing error, frequency error, and/or power level error values based on network conditions. In this embodiment, generating offset instructions at S720 includes generating the offset values in each of the time, frequency, and power level instructions based on the timing error, frequency error, and power level error values measured in the monitoring step S725.

Figure 9:
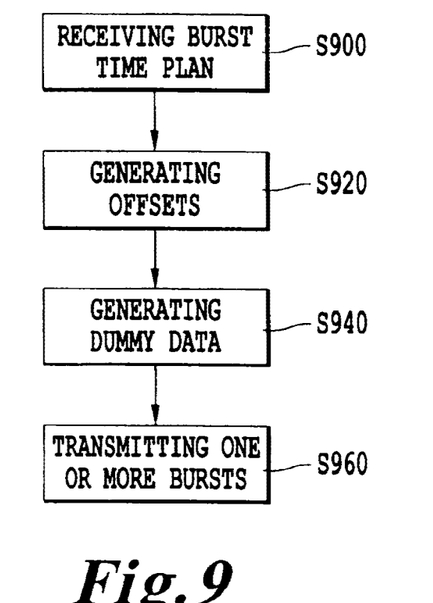
FIG. 9 is a flow diagram of a method of receiving a burst time plan and transmitting one or more bursts in a subsequent frame in a communication network according to an embodiment of the present invention.

FIG. 9 is a flow diagram of a method of receiving a burst time plan and transmitting one or more bursts in a subsequent frame in a communication network according to an embodiment of the present invention. The method includes the steps of receiving a burst time plan at step S900, generating offsets, as necessary, based on allocation information in the received burst time plan at step S920, generating dummy data for transmission with the generated offsets, as necessary, based on allocation information in the received burst time plan at step S940, and transmitting one or more bursts in a subsequent frame based on the received burst time plan at step S960.

Receiving a burst time plan at step S900 is followed by processing the received data and may be followed by generating offset values at step S920 when the burst time plan includes an allocation for at least one dummy acquisition time slot.

Generating the offset values at step S920, according to one embodiment, includes receiving instructions regarding at least one of a timing offset, a frequency offset, and a power level offset in the allocation information within the burst time plan.

Generating the offset values at step S920, according to another embodiment, includes generating at least one of a timing offset, a frequency offset, and a power level offset based on a predetermined range or a predetermined distribution for each of a timing, frequency, and power level offset.

At step S960, one or more bursts are transmitted in the allocated time slot or time slots. A dummy acquisition burst generated at step S940 and transmitted at step S960 may include one or more offset values generated at step S920.

Numerous modifications and variations of the present invention are possible in light of the above teachings. It is therefore to be understood that within the scope of the appended claims, the invention may be practiced otherwise than as specifically described herein.

The invention claimed is:

1. A hub in a communication network, the hub comprising:
   a burst time plan generating circuit that generates a burst time plan including time slot allocation information by dynamically adjusting a ratio of a first probability of a dummy acquisition time slot to a second probability of an empty acquisition time slot according to a ratio of M/N while maintaining a constant probability of a real acquisition time slot, wherein M is a number of real bursts transmitted in a previous frame, N is a sum of dummy, real and empty acquisition time slots in a period of time, the time slot allocation information identifies at least one time slot in the subsequent frame as a dummy acquisition time slot assigned to at least one remote terminal already acquired in the network, a transmitter transmits the burst time plan including the time slot allocation information, dummy bursts are transmitted during dummy acquisition time slots, and the dynamic adjustment of the ratio of the first probability to the second probability disguises real acquisition time slots as dummy acquisition time slots to an unauthorized third party eavesdropper.

2. The hub according to claim 1, further comprising:

a receiver to receive the subsequent frame including burst transmissions from remote terminals transmitted in the time slots allocated according to the time slot allocation information in the burst time plan.

3. The hub according to claim 1, wherein the time slot allocation information includes time slot information specifying a respective time for transmission in each time slot of the subsequent frame, each time being based on a master clock.

4. The hub according to claim 1, wherein the burst time plan generating circuit is further configured to generate the time slot allocation information including a first instruction to at least one remote terminal not already joined in the network that a time slot of the subsequent frame that the time slot allocation information in the burst time plan identifies as a real acquisition time slot is available for the at least one remote terminal to transmit a request to join the network, a second instruction to at least one remote terminal already joined in the network to transmit in a time slot of the subsequent frame that the time slot allocation information in the burst time plan identifies as a dummy acquisition time slot, and a third instruction that no remote terminal, within or outside the network, may transmit in a time slot of the subsequent frame that the time slot allocation information in the burst time plan identifies as an empty acquisition time slot.

5. The hub according to claim 1, wherein the burst time plan generating circuit is further configured to generate at least one of a timing offset instruction, a frequency offset instruction, and a power level offset instruction to be included in the time slot allocation information for a remote terminal already joined in the network to transmit a dummy request in a dummy acquisition slot in the subsequent frame with at least one of a timing offset according to the timing offset instruction, a frequency offset according to the frequency offset instruction, and a power level offset according to the power level offset instruction.

6. The hub according to claim 1, wherein the burst time plan generating circuit is further configured to generate at least one of a timing offset instruction, a frequency offset instruction, and a power level offset instruction to be included in the time slot allocation information for each of at least two remote terminals already joined in the network to transmit in a same dummy acquisition slot in the subsequent frame with at least one of a timing offset according to the respective timing offset instruction, a frequency offset according to the respective frequency offset instruction, and a power level offset according to the respective power level offset instruction.

7. The hub according to claim 2, further comprising:

a distribution controller that dynamically adjusts a probability that an acquisition time slot in the subsequent frame is allocated to be one of the real acquisition time slots, the dummy acquisition time slots and the empty acquisition time slots so as to disguise the real acquisition time slots as the dummy acquisition time slots to the unauthorized third party eavesdropper.

8. The hub according to claim 7, wherein the distribution controller dynamically adjusts the probability based on a random number.

9. The hub according to claim 7, wherein the distribution controller dynamically adjusts the probability of an acquisition time slot in the subsequent frame being a dummy acquisition time slot based on a number of bursts in real acquisition slots received from new remote terminals not already joined in the network in at least one previous frame.

10. The hub according to claim 2, further comprising:

a distribution controller that dynamically adjusts a third probability that a first acquisition time slot in a first period of time is allocated to be one of the real acquisition time slots, the dummy acquisition time slots and the empty acquisition time slots, and a fourth probability that a second acquisition time slot in a second period of time is allocated to be one of the real acquisition time slots, the dummy acquisition time slots and the empty acquisition time slots, and the distribution controller controls the third probability to be different than the fourth probability.

11. The hub according to claim 10, wherein the distribution controller dynamically adjusts the third probability based on a first number of bursts in real acquisition time slots received from new remote terminals not already joined in the network over a first preceding time period prior to the first period of time, and to control the fourth probability based on a second number of bursts in real acquisition time slots received from new remote terminals not already joined in the network over a second preceding time period prior to the second period of time.

12. A remote terminal communicating in a communication network, the remote terminal comprising:

a receiver configured to receive a burst time plan from a hub, the burst time plan including time slot allocation information that dynamically adjusts a ratio of a first probability of a dummy acquisition time slot to a second probability of an empty acquisition time slot according to a ratio of M/N while maintaining a constant probability of a real acquisition time slot, wherein M is a number of real bursts transmitted in a previous frame, N is a sum of dummy, real and empty acquisition time slots in a period of time, the time slot allocation information identifies a dummy acquisition time slot in the subsequent frame as being assigned to the remote terminal, a transmitter transmits a dummy burst in the dummy acquisition time slot in the subsequent frame, real bursts are transmitted during real acquisition time slots, no bursts are transmitted during empty acquisition time slots, and the dynamic adjustment of the ratio of the first probability to the second probability, according to the bust time plan, disguises real acquisition time slots as dummy acquisition time slots to an unauthorized third party eavesdropper.

13. The remote terminal according to claim 12, wherein the receiver is further configured to receive at least one of a timing offset instruction, a frequency offset instruction, and a power level offset instruction in the time slot allocation information, and the transmitter is further configured to transmit, in the dummy acquisition time slot in the subsequent frame with at least one of a timing offset according to the timing offset instruction, a frequency offset according to the frequency offset instruction and a power level offset according to the power level offset instruction.

14. The remote terminal according to claim 12, further comprising:

an offset generating circuit that generates at least one of a timing offset, a frequency offset, and a power level offset based on a random number, each offset being controlled based on a predetermined respective range or a predetermined respective distribution, wherein the transmitter is further configured to transmit, in the dummy acquisition time slot in the subsequent frame with at least one of the timing offset, the frequency offset and the power level offset.

15. A hub in a communication network, the hub comprising:

a burst time plan generating circuit that generates a burst time plan including time slot allocation information by dynamically adjusting a ratio of a first probability of a dummy contention time slot to a second probability of an empty contention time slot according to a ratio of M/N while maintaining a constant probability of a real contention time slot, wherein M is a number of real bursts transmitted in a previous frame, N is a sum of dummy, real and empty contention time slots in a period of time, the time slot allocation information identifies at least one time slot in the subsequent frame as a dummy contention time slot assigned to at least one remote terminal already acquired in the network and instructing the at least one remote terminal to transmit dummy data in the dummy contention time slot in the subsequent frame, a transmitter transmits the burst time plan including the time slot allocation information, real bursts are transmitted during real contention time slots, dummy bursts are transmitted during dummy contention time slots, no bursts are transmitted during empty contention time slots, and the dynamic adjustment of the ratio of the first probability to the second probability disguises real contention time slots as dummy contention time slots to an unauthorized third party eavesdropper.

16. The hub according to claim 15, wherein the burst time plan generating circuit is further configured to generate the time slot allocation information that includes a first instruction to two or more remote terminals in the network that a time slot of the subsequent frame that the time slot allocation information in the burst time plan identifies as a real contention time slot is available for transmission of data, a second instruction to at least one remote terminal in the network to transmit dummy data in a time slot of the subsequent frame that the time slot allocation information in the burst time plan identifies as a dummy contention time slot, and a third instruction that no remote terminals may transmit in a time slot of the subsequent frame that the time slot allocation information in the burst time plan identifies as an empty contention time slot.

17. The hub according to claim 15, further comprising:

a receiver to receive the subsequent frame including burst transmissions from remote terminals transmitted in the time slots allocated according to the time slot allocation information in the burst time plan.

18. The hub according to claim 15, wherein the time slot allocation information includes time slot information specifying a respective time for transmission in each time slot of the subsequent frame, each time being based on a master clock.

19. The hub according to claim 15, wherein the burst time plan generating circuit is further configured to generate time slot allocation information that assigns a same dummy contention time slot to two or more remote terminals in the network, and instructs the two or more remote terminals to transmit dummy data in the same dummy contention time slot in the subsequent frame.

20. The hub according to claim 17, further comprising:

a distribution controller dynamically adjusts a probability that a contention time slot in the subsequent frame is allocated to be one of the real contention time slots, the dummy contention time slots and the empty contention time slots so as to disguise the real acquisition time slots as the dummy acquisition time slots to the unauthorized third party eavesdropper.

* * * * *